United States Patent [19]

Ting et al.

[11] Patent Number: 5,767,319

[45] Date of Patent: Jun. 16, 1998

[54] PREPARATION OF TETRAHYDROISO-α-ACIDS BY THE HYDROGENATION OF THE METAL SALTS OF ISO-α-ACIDS

[75] Inventors: Patrick L. Ting. Brookfield; Michael A. VanSanford. Wales; Jay R. Refling. Milwaukee; Henry Goldstein. Brookfield, all of Wis.

[73] Assignee: Miller Brewing Company. Milwaukee. Wis.

[21] Appl. No.: 739,764

[22] Filed: Oct. 30, 1996

[51] Int. Cl.⁶ ............................... C07C 45/62
[52] U.S. Cl. ............ 568/347; 568/350; 426/600
[58] Field of Search ............... 568/347, 350; 426/600

[56] References Cited

U.S. PATENT DOCUMENTS

| | | | |
|---|---|---|---|
| 3,765,903 | 10/1973 | Clarke et al. | 99/50.5 |
| 4,644,084 | 2/1987 | Cowles et al. | 568/341 |
| 4,666,731 | 5/1987 | Todd, Jr. | 426/600 |
| 5,013,571 | 5/1991 | Hay | 426/600 |
| 5,200,227 | 4/1993 | Guzinski et al. | 426/600 |
| 5,600,012 | 2/1997 | Poyner et al. | 568/347 |

*Primary Examiner*—James H. Reamer
*Attorney, Agent, or Firm*—Quarles & Brady

[57] ABSTRACT

Tetrahydroiso-α-acids are prepared from iso-α-acids metal salts by hydrogenating the salts in a reaction solvent of a lower alkanol containing about 5% to about 20% w/w water and in the presence of up to about 5–50 psig hydrogen and a hydrogenation catalyst at about 30°–50° C. to form tetrahydroiso-α-acids.

34 Claims, 2 Drawing Sheets

PREPARATION OF TETRAHYDROISO-α-ACIDS BY THE HYDROGENATION OF THE METAL SALTS OF ISO-α-ACIDS

FIELD OF THE INVENTION

The present invention relates to bittering agents for flavoring beer and other beverages. More particularly, it relates to a method of preparing tetrahydroiso-α-acids (sometimes called tetrahydroisohumulones) which are known bittering agents.

BACKGROUND OF THE INVENTION

Tetrahydroiso-α-acids are light-stable FDA-approved bittering agents which can be used to add a hop flavor to beer. They can be prepared from the β-acids (or lupulones) in hop extracts. The hop extracts also contain α-acids (or humulones) which can be used to make tetrahydroiso-α-acids.

In the Worden, et al., U.S. Pat. No. 3,552,975 a method is disclosed employing organic solvents and lead salts to make tetrahydroiso-α-acids from β-acids. The final product is a crude mixture from which the residues of lead can only be removed with great difficulty. The presence of residual lead in products to be consumed is obviously undesirable.

In the Worden U.S. Pat. No. 3,923,897 a process for preparing tetrahydroiso-α-acids from β-acids is disclosed which involves the oxidation of desoxytetrahydro-α-acids with a peracid followed by isomerization of the resulting tetrahydro-α-acids. The process does not utilize lead salts but it is conducted in water immiscible organic solvents and it involves cumbersome solvent changes which increase process cost. The presence of even residual amounts of such solvents in food products, such as beverages, is undesirable.

In the Cowles, et al., U.S. Pat. No. 4,644,084 a process is disclosed for making tetrahydroiso-α-acids by treating β-acids to form desoxytetrahydro-α-acids which are dissolved in an aqueous alcoholic caustic solution and then oxidized with an oxygen-containing gas in the presence of metallic ions to form the desired tetrahydroiso-α-acids. The process of Cowles, et al. patent does not use undesirable organic solvents and is superior to other known processes using β-acids.

In the Hay U.S. Pat. No. 5,013,571 a process is disclosed for simultaneously isomerizing and reducing α-acids to tetrahydroiso-α-acids (THIAA). And another process is disclosed for reducing iso-α-acids to THIAA. The Hay processes use relatively high pHs (8 to 10), significant amounts of water and hydrogen pressures above about 50 psig. Relatively long reaction times and high reaction temperature are required. As a result, side reactions can take place that can result in undesired products. Furthermore, the desired tetrahydroiso-α-acids are not easily isolated from the Hay reaction mixture.

Ting, et al., U.S. Pat. 5,523,489, disclose a process for preparing tetrahydroiso-α-acids wherein iso-α-acids are hydrogenated in a reaction solvent of ethanol containing up to about 15% water in the presence of about 1 to about 40 psig of hydrogen and a hydrogenation catalyst. However, the catalytic activity of the Pd/C catalyst must be carefully controlled (by varying water content) to prevent incomplete or over-reduced hydrogenation products.

Another method of making tetrahydroiso-α-acids involves consecutive reactions wherein α-acids are first isomerized to form iso-α-acids. Then the iso-α-acids are hydrogenated to form tetrahydroiso-α-acids (P. Brown, et al., *J. Chem. Soc.* 545–551 (1959)).

For practical purposes, the hydrogenation of the resulting iso-α-acids must be easily operated and completed with a relatively high purity and yield. Any deviation in hydrogenation conditions causes an incomplete reaction and produces dihydroiso-α-acids (partial hydrogenation) along with unreduced iso-α-acids. These products cause light instability in beer. An excessive hydrogenation gives rise to over-reduced products, called neo-tetrahydroiso-α-acids, which do not add bitterness to beer, at the cost of valuable ingredients.

A complete hydrogenation usually is not achieved without considerable efforts in choosing a selective catalyst, varying the catalyst loading, manipulating the reaction time, changing the reaction temperature and precise monitoring the formation of the products. Quite often, over-reduced products are obtained due to lack of a clear indication or stop-sign to terminate the hydrogenation reaction at the stage where the two double bonds (C=C) have been completely reduced. Especially, when the process is scaled up, inconsistent hydrogenation and over-reduction often occur. Further, the hydrogenation of iso-α-acids to tetrahydroiso-α-acids using only a Pd/C type catalyst (due to the BATF regulation) and no organic solvents (other than alcohol) is very delicate and difficult to precisely control. Development of a rugged process is vital in order to achieve a successful scale-up.

It obviously would be desirable to have a simple method of making tetrahydroiso-α-acids from iso-α-acids which does not result in the formation of undesired products and in which it is easy to isolate the tetrahydroiso-α-acids from the reaction mixture.

SUMMARY OF THE INVENTION

We have discovered a method of preparing tetrahydroiso-α-acids that does not result in the formation of undesirable products.

The invention provides a method of preparing tetrahydroiso-α-acids comprising the steps of preparing a feed material of iso-α-acid metal salts wherein the metal ion is selected from the group consisting of alkali metals, alkaline earth metals and transition metals; dissolving the feed material in an aqueous lower alkanol solution containing about 5% to about 20% w/w water to form a reaction medium; reducing the iso-α-acids salts in the presence of about 5–50 psig of hydrogen and a palladium on carbon catalyst at about 30°–50° C. to form tetrahydroiso-α-acids; and recovering the tetrahydroiso-α-acids. Preferably, the lower alkanol is ethanol.

A reaction temperature of 40°–45° C. is most preferred. A hydrogen pressure of about 5–20 psig is preferred while a pressure of about 20 psig is most preferred.

Preferably, the metal ion is an alkaline earth metal and most preferred is magnesium. The molar ratio of metal ion to iso-α-acids should be at least 0.5:1.

The feed material can be prepared by isomerizing α-acids to iso-α-acids in the presence of said metal ion or by adding said metal ion to an aqueous solution of iso-α-acids.

The objects of the invention, therefore, include providing a method of preparing tetrahydroiso-α-acids of the above kind:

(a) which provides a simple way of preparing tetrahydroiso-α-acids that does not result in the formation of undesirable products;

(b) which provides a way of using iso-α-acid salts;

(c) which results in high purity and excellent yield;

(d) which is easy to scale up and is rugged and controllable with a clear signal for completion;

(e) which avoids the acidification and phase separation of the iso-α-acids feed material; and (f) which avoids the drawbacks associated with prior art processes such as handling difficulty, longer reaction times, and decomposed products.

These and still other objects and advantages of the present invention will be apparent from the description below. However, this description is only of the preferred embodiments. The claims should, therefore, be looked to in order to assess the whole scope of the invention.

DETAILED DESCRIPTION OF THE INVENTION

The hydrogenation of iso-α-acids to tetrahydroiso-α-acids is a classical reduction of two double bonds (C=C). The isopentenyl and isohexenoyl side chains located on the iso-α-acid molecule are hydrogenated to saturation so that the saturated isohexenoyl side chain becomes insensitive to photolysis. The resultant isohexanoyl side-chain is unlike its original unsaturated isohexenoyl side-chain which is susceptible to the formation of 3-methyl-2-butene-1-thiol which produces an undesirable skunky flavor in beer.

Figure 1:
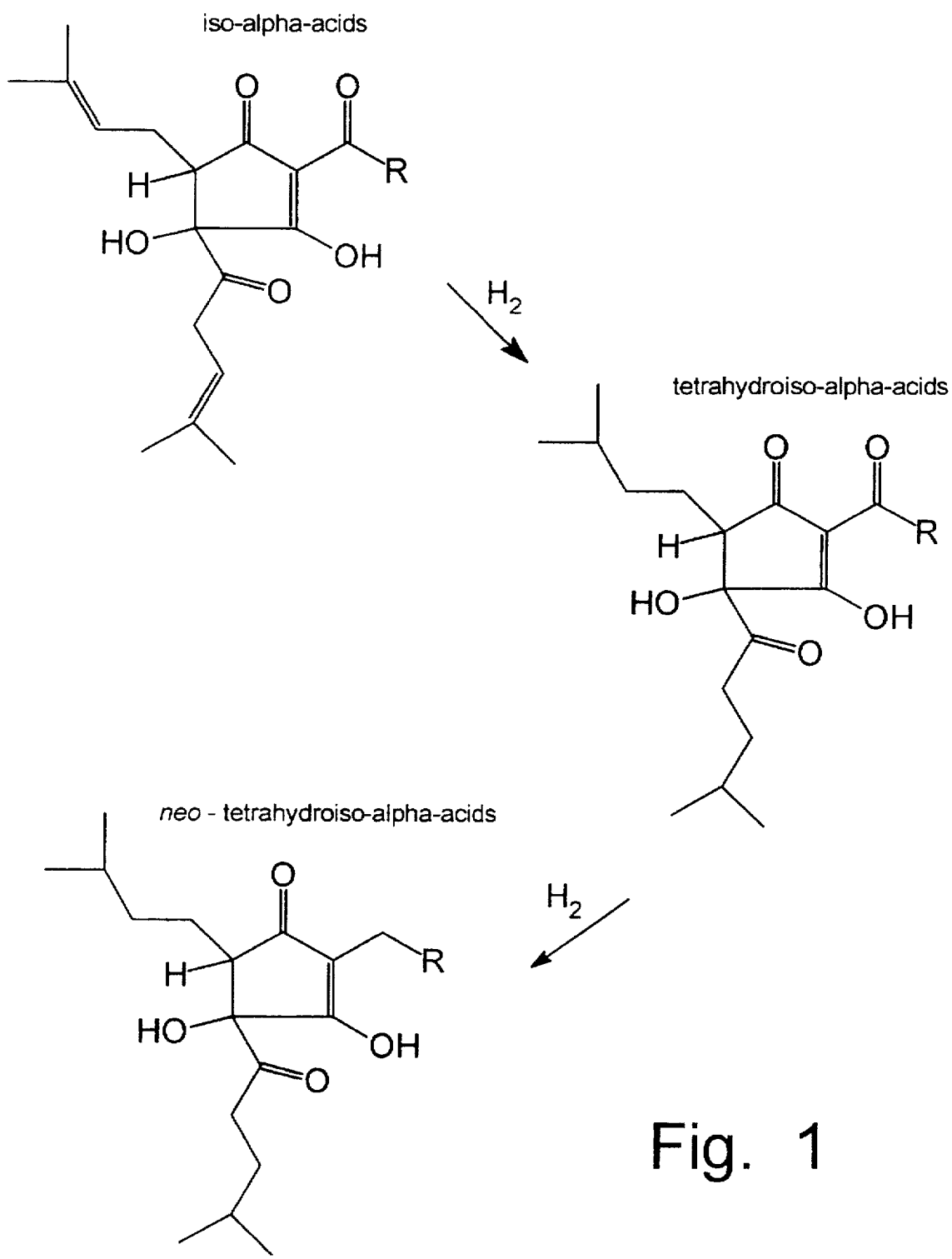
FIG. 1 is a schematic of the hydrogenation of iso-α-acids.

The desired hydrogenation is difficult due to possible reduction of the β-triketo moiety. One of the carbonyl groups in the β-triketo moiety tends to be reduced to a methylene ($CH_2$) group to form neo-tetrahydroiso-α-acids which are not bitter or light stable, and are less soluble in aqueous solution (see FIG. 1). The iso-α-acids consist of cis and trans-isomers which are reduced differently because of the stereochemistry. In the case of the cis-isomer, which is less sterically hindered than the trans-isomer, the desired saturation of the two double bonds occurs relatively rapidly. In the case of the trans-isomer, steric hindrance impedes the desired reaction and the β-triketo methane system can be partially reduced. When this occurs neo-tetrahydroiso-α-acids are formed. In other words, the rate of hydrogenation of two double bonds on the trans-isomers are slower than that of the carbonyl group of the β-triketo moiety. Besides the two C=C groups, one of the C=O groups is reduced to different degrees with respect to both isomers. Therefore, a complete hydrogenation suffers from loosing most the trans-isomers which are converted into the over-reduced products. Under prolonged reaction conditions, cis-isomers can also be converted to the over-reduced products.

Different approaches to hydrogenating iso-α-acids were tried, including screening various suitable Pd/C catalysts, modification of the palladium on carbon catalyst, deactivation of the catalyst, and varying the reaction conditions, but were unsuccessful in achieving the desired degree of hydrogenation of iso-α-acids. The present invention provides a method which surprisingly and unexpectedly results in a complete hydrogenation of cis- and trans-iso-α-acids (with little or no over or under reduced products).

Our experiments indicated that the amount of water in the reaction medium is critical. Increasing the water content seemed to deactivate the catalyst and slowed the hydrogenation of β-triketo group. By carefully adjusting the water content, several catalysts were effective on a bench scale. However, on scale-up, inconsistent results were obtained.

We discovered that the present inventive method results in an unexpected improvement in the hydrogenation of iso-α-acids by using a reaction medium containing magnesium sulfate. Using magnesium salts to accelerate the rate of isomerization is known. However, we unexpectedly discovered that $Mg^{+2}$ salts not only accelerate the isomerization reaction, but also protect the labile iso-α-acids to thereby prolong their storage time without decomposition to humulinic acids (which have no bitter value). As discussed below, $Mg^{+2}$ salts protect the labile iso-α-acids during the hydrogenation reaction.

We typically carried out the hydrogenation reaction in an aqueous ethanol solution (containing 5%–20% water and pH 1–5) using 5% Pd/C as the catalyst. The feed material of iso-α-acids was prepared by isomerization of a caustic α-acids aqueous solution in the presence of magnesium sulfate. Acidification of the end-mixture was used to free the iso-α-acids and facilitate the phase separation. One phenomenon that caught our attention was the appearance of some white precipitates in the feed solution. Under these conditions, the hydrogenation seemed to progress smoothly with the formation of less over-reduction products. In contrast, if the white precipitate was removed, the hydrogenation became uncontrollable and produced more over-reduced products (or nearly no trans-tetrahydroiso-α-acids). The white particulate was found to be magnesium sulfate. We observed the same phenomenon between water washed and unwashed feed materials in the pilot plant.

Although aqueous ethanol is the preferred reaction solvent for the hydrogenation reaction, any lower alkanol is acceptable. By lower alkanol we mean straight or branched chain alcohols having 1–6 carbons.

The desired hydrogen pressure for the hydrogenation reaction is about 5–50 psig. However, a hydrogen pressure of about 5–20 psig is more preferred and a hydrogen pressure of about 20 psig is most preferred.

The desired temperature for the hydrogenation reaction is about 30°–50° C. However, a reaction temperature of about 40°–45° C. is most preferred.

The cis and trans-iso-α-acids can exist as free organic acids as well as neutral complexes or salts. Initially, we found that the contribution of magnesium sulfate on the quality of the hydrogenation of iso-α-acids products was inconsistent. When the reaction was carried out at less than pH 5, magnesium sulfate showed less solubility and very little effect on the prevention of over-reduction. However, the effectiveness of magnesium sulfate increased at greater than pH 5. Above pH 7, no significant improvement was observed. We hypothesized that an interaction between iso-α-acids and magnesium sulfate occurs at a state of higher electron density. The acidic proton on the β-triketo group is removed and ionized when iso-α-acids are neutralized with an equivalent amount of base. Thus, complexes of magnesium ions and iso-α-acids are formed and can be hydrogenated.

Experimentation indicated that a reaction mixture should contain at least a molar ratio of 0.5:1 of magnesium salt to iso-α-acids and an equivalent amount of caustic to iso-α-acids in an aqueous ethanolic solution. Insufficient amounts of magnesium salt caused both over-reduction and a reduction of the amounts of trans-tetrahydroiso-α-acids formed. This supports the above hypothesis.

Figure 2:
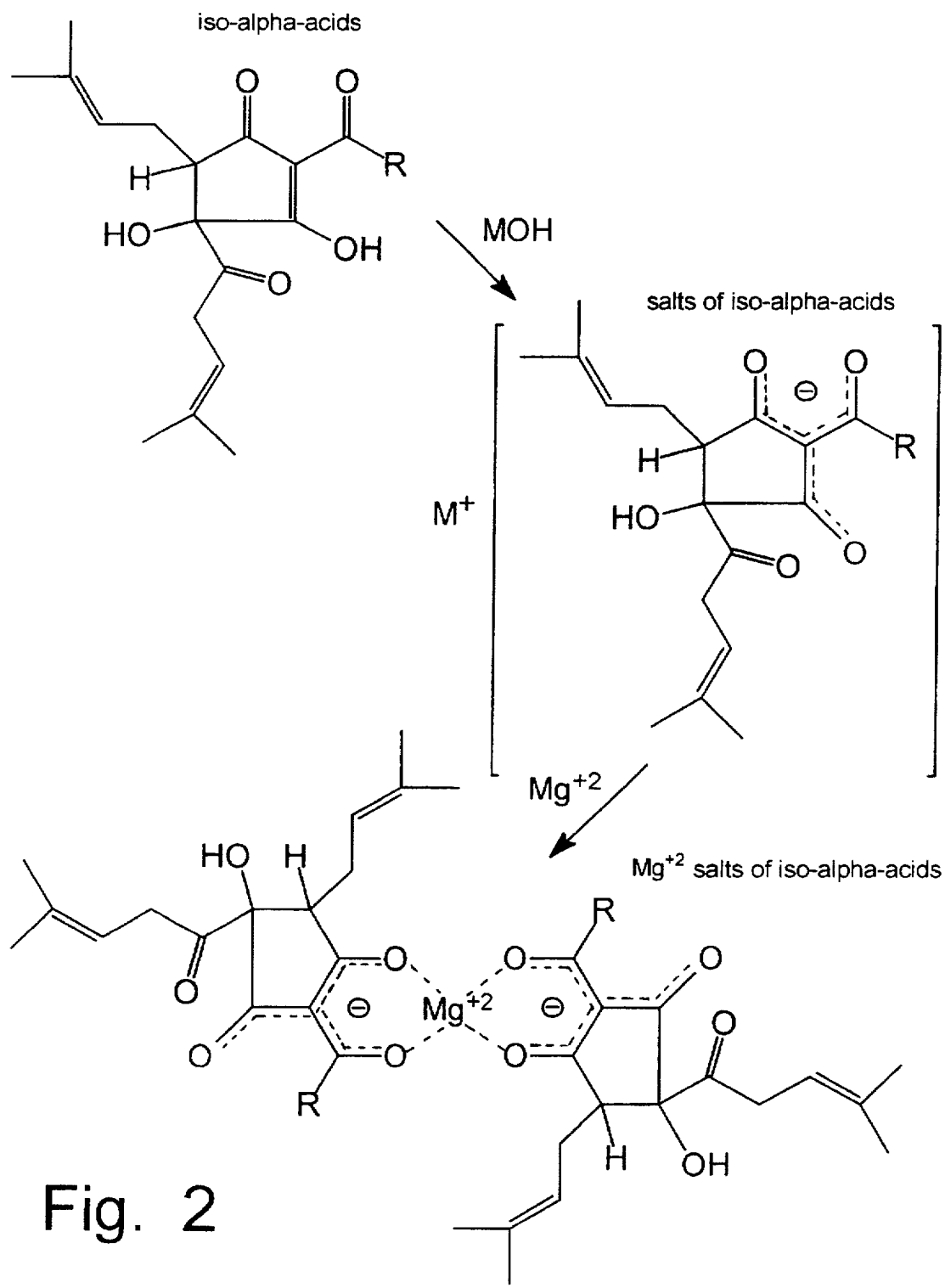
FIG. 2 is a schematic of the process of the present invention.

A proposed reaction mechanism and the nature of the complex between $Mg^{+2}$ ions and iso-α-acids are shown in FIG. 2. It demonstrates that two carbonyl groups are shielded by $Mg^{+2}$ ion or by a high electron density which makes the hydrogenation of these groups difficult.

Other magnesium salts were also evaluated. Magnesium hydroxide, due to its alkalinity, was used alone. Other magnesium salts can be used such as magnesium chloride, magnesium sulfate, magnesium oxide, magnesium acetate, magnesium carbonate, and magnesium silicate.

The other important factor for promoting the iso-α-acid/$Mg^{+2}$ complex and increasing the solubility of the magnesium salt is water. A suitable amount of water (10–25% w/w) is required in the ethanol solution to facilitate both the reaction and the process (especially during the filtration of the catalyst). Successful hydrogenation of this mixture can be carried out under 20 psig of hydrogen and 30°–50° C. for 2–3 hours. Completion of the hydrogenation reaction was clearly indicated by a cessation of hydrogen uptake. After acidification, ethanol removal, and phase separation, the yield of the desirable products was in the range of 85 to 100% with greater than 70% purity. Loss of trans-isomers and the formation of over-reduced products was eliminated or minimized.

To further confirm that $Mg^{+2}$ ions actually play an important role in the regulation of the hydrogenation (i.e., to keep the β-triketo group intact) regardless of the pH values of the reaction medium, the isolated magnesium complexes of isohumulates were used as the feed material and evaluated for the hydrogenation reaction. We prepared and isolated the complexes of magnesium isohumulates (magnesium complexes of iso-α-acids) by two methods: 1) From the magnesium catalyzed isomerization mixture of α-acids, yellow solids of $Mg^{+2}$-Isohumulates were produced at the end of the isomerization but before acidification. 2) We treated the iso-α-acids with an equivalent amount of caustic (NaOH or KOH) and 0.5 mole of magnesium sulfate (or magnesium hydroxide alone) to precipitate the yellow solids of magnesium complex.

The hydrogenation of $Mg^{+2}$-Isohumulates was performed in either a 95% ethanol or an aqueous ethanol solution (containing 20–25% w/w of water). The reaction went smoothly and stopped in 1.5–3 hours. After acidification and removal of ethanol, an oil containing high purity and a good yield of tetrahydroiso-α-acids was obtained. It contained little or no over-reduced side-products. Moreover, excessive hydrogenation did not produce the undesirable over-reduced products. The hydrogenation reaction was controllable and did not run away. Evidently, the β-triketo group on the iso-α-acid molecule is shielded by magnesium ion leaving the two double bonds available for the hydrogenation.

Due to the presence of the β-triketo group, the iso-α-acids can also complex with various different alkaline earth metal salts and transition metal salts such as $Ca^{+2}$, $Ba^{+2}$, $Zn^{+2}$, $Mn^{+2}$, $Ni^{+2}$, $Fe^{+2}$, $Cr^{+2}$, $Co^{+2}$, $Cu^{+2}$, $Ti^{+2}$, $Sr^{+2}$, $Pd^{+2}$, and $Pt^{+2}$, etc. These are all viable alternatives to $Mg^{+2}$ for the hydrogenation reaction.

Since the iso-α-acids can be neutralized (ionized) with many different alkali such as NaOH, KOH, $NH_3$ ($NH_4OH$), $Mg(OH)_2$, etc. to form salts in which the acidic proton on the β-triketo group is removed, they can be considered as the suitable reagents for the process of the present invention. Because the β-triketo group is delocalized and shielded by a high electron density, the C=O groups located on the salts of iso-α-acids becomes inert to the hydrogenation reaction. To confirm this, both potassium and sodium salts of iso-α-acids were tested. Potassium and sodium salts of iso-α-acids are commonly made in an aqueous solution, but due to a lower solubility, sodium salts are usually oiled out or insoluble in aqueous solution. The hydrogenation of these salts in ethanol was performed. The reaction went smoothly and ended in 2–3 hours. After acidification and removal of the ethanol, an oil containing tetrahydroiso-α-acids in high purity and a good yield was obtained.

Possibly, the organic bases such as amines and pyridine may act similar to the inorganic bases to shield the β-triketo group. But they may not be desirable for use in food products.

A. Preparation of Tetrahydroiso-α-Acids:
Hydrogenation of $Mg^{+2}$-Isohumulates (Salts/Complexes of Iso-α-acids)

1. Preparation of Magnesium Salts of Iso-α-acids (Feed Material)

The magnesium salts is an intermediate during the isomerization of α-acids to iso-α-acids. They can be prepared by two routes as follows:

a. From α-Acids α-acids (humulones) can be isomerized to iso-α-acids (isohumulones) in an alkaline aqueous solution (pH 7–10) catalyzed by an inorganic magnesium salt (such as magnesium chloride, magnesium sulfate, magnesium hydroxide, and magnesium oxide). The reaction mixture is heated until the α-acids are completely converted into iso-α-acids.

At this stage, we found that the reaction mixture of magnesium salts of iso-α-acids is suitable for the in situ hydrogenation as described below, rather than using an end product of iso-α-acids (free acid form) which is obtained by a subsequent acidification and phase separation.

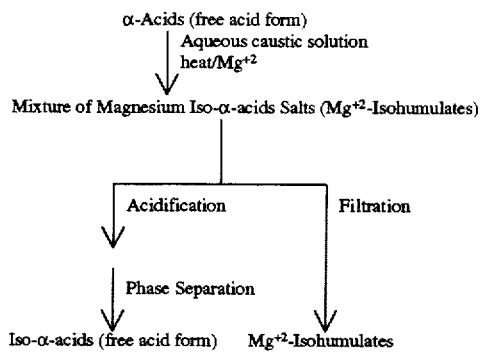

b. From Iso-α-Acids

Alternatively, iso-α-acids (free acid form) is an end-product which is usually used to prepare a commercial post-kettle bittering agent (20–35% concentration by weight). The iso-α-acids are dissolved in an equivalent amount of potassium hydroxide solution. By addition of 0.5–1.0 molar ratio of inorganic magnesium salts a yellow precipitation mixture is formed. Filtration yields the yellow solids of magnesium isohumulates (magnesium salts or complexes of iso-α-acids).

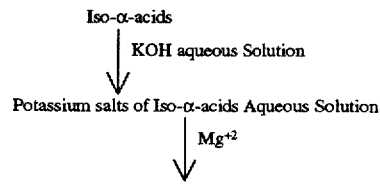

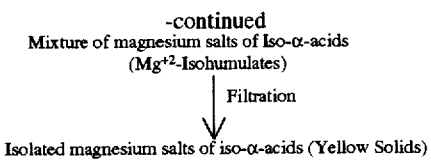

2. Hydrogenation of Magnesium Salts of Iso-α-acids to Tetrahydroiso-α-acids

Either the mixture of magnesium salts of iso-α-acids or the isolated magnesium iso-α-acids salts (obtained from either route "a" or route "b" above dependent upon the availability) is used as the feed material for this hydrogenation. By dissolving the feed material in a low molecular weight alcohol or aqueous alcohol (methanol, ethanol or isopropyl alcohol etc.), the resulting solution is subjected to hydrogenation under about 20 psig of hydrogen and about 20°–50° C. using palladium on carbon as the catalyst. After completion of the hydrogenation, the catalyst is removed by filtration and the filtrate is acidified to free the tetrahydroiso-α-acids. After evaporating the alcohol and phase separation, an oily material of tetrahydroiso-α-acids is thus obtained. Formulation of the tetrahydroiso-α-acids in aqueous potassium hydroxide produces up to a 10% concentration solution (analyzed by HPLC) which is suitable for the post-kettle addition in the brewing process.

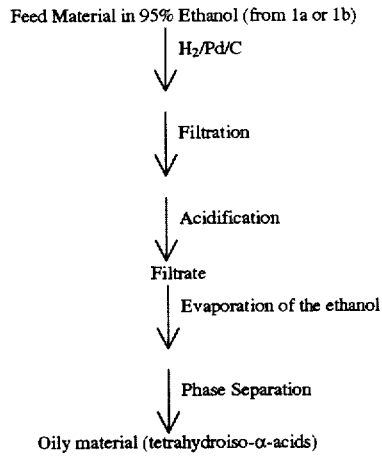

B. Hydrogenation of Mixture of Magnesium Salts of Iso-α-acids

EXAMPLE 1

To 69 g of an extract containing 74% iso-α-acids (0.14 mole) was added 7.8 g of KOH (0.14 mole) in 50 mL of water, 200 mL of 95% ethanol, 18.9 g of $MgSO_4 \cdot 7H_2O$ (0.077 mole), and 6 g of 5% Pd/C catalyst in a one-liter autoclave. The autoclave was charged with 50 psig of $N_2$ and then 20 psig of $H_2$ three times. The reaction mixture was maintained at 30°–50° C. and 20 psig until the uptake of hydrogen ceased. The reaction took 2–3 hours. After filtration of the catalyst, the filtrate was acidified with sulfuric acid and then evaporated to remove the ethanol. After water wash and phase separation, it produced an oil with an 85% yield of tetrahydroiso-α-acids. It was then formulated to 5–10% concentration in an aqueous potassium solution to be used as the post-kettle bittering agent.

EXAMPLE 2

To a mixture containing 70 g of an extract containing 52 g of iso-α-acids, 4 g of $Mg(OH)_2$, 50 mL of water, 200 mL of 95% ethanol and 6 g of 5% Pd/C catalyst was added and charged with 50 psig of $N_2$ and then 20 psig of $H_2$ three times in a one-liter autoclave. The autoclave was heated to 50° C. and maintained at 30°–50° C. The reaction took 3–5 hours to complete. After filtration, the filtrate (321.1 g) was found to contain 16.3% tetrahydroiso-α-acids which accounted for 90% of the total yield. After acidification, evaporation, water wash, and phase separation, it afforded an oil. The oil was then formulated to 5–10% concentration of tetrahydroiso-α-acids in an aqueous potassium solution to be used as the post-kettle bittering agent.

EXAMPLE 3

To a mixture containing 55 g of pure iso-α-acids, 9 g of KOH in 90 mL of water, 19 g of $MgSO_4 \cdot 7H_2O$, 250 mL of 95% ethanol and 6 g of 5% Pd/C catalyst was added and hydrogenated at 20 psig of $H_2$ for two hours at 30°–50° C. After a work-up procedure including filtration, acidification, concentration, washing and phase separation, 56 g of an oil containing 74% pure tetrahydroiso-α-acids was obtained, which accounted for 84% of the total yield. It was then formulated to 5–10% concentration in an aqueous potassium solution to be used as the post-kettle bittering agent.

EXAMPLE 4

Iso-α-acids (53.4 g) were formulated to a 35% aqueous solution by adding 8.4 g of 87% KOH and 90 mL water. To 140 mL of the solution (50 g of iso-α-acids, 0.14 mole) was added 19 g of $MgSO_4 \cdot 7H_2O$ (0.077 mole), 4.7 g of 5% Pd/C catalyst and 250 mL of 95% ethanol. The hydrogenation was carried out under 20 psig and 20°–47° C. for 1.5 hours. After removal of the catalyst by filtration, 381.5 g of filtrate was obtained and found to contain 12% tetrahydroiso-α-acids which accounted for a 90% yield.

C. Preparation of $Mg^{+2}$-Isohumulates (Isolated Magnesium Salts of Iso-α-acids)

EXAMPLE 5

To 184 g of purified α-acids (82% α-acids; 0.426 mole) was added 27.45 g (0.426 mole) of 870 KOH and 52.45 g (0.213 mole) of $MgSO_4 \cdot 7H_2O$ in 1200 mL of water. The mixture was heated and agitated to 85° C. for 1 hour. After cooling, a 228 g of yellow solids of $Mg^{+2}$-isohumulates was obtained by filtration.

D. Hydrogenation of $Mg^{+2}$-Isohumulates (Isolated Magnesium Salts of Iso-α-acids)

EXAMPLE 6

To a one-liter autoclave was added 66.8 g of $Mg^{+2}$-isohumulates complexes, 90 mL of water, 250 mL of 950 ethanol and 8 g of 5% Pd/C catalyst. The reaction mixture was hydrogenated under 20 psig of hydrogen and maintained at 30°–50° C. The reaction was completed within 2.5 hours. After work-up, 51.4 g of oil containing 64% tetrahydroiso-α-acids was obtained which accounted for 66% of the total yield. The same result was obtained when 300 mL of 95% ethanol was used (no water was added).

It will be apparent to those skilled in the art that the method of the present invention for converting iso-α-acids to tetrahydroiso-α-acids avoids the use of objectionable organic solvents and other toxic reagents. The method also employs low pHs and low pressures. Also, the metals employed by the present invention to protect the carbonal groups in the β-triketo moiety of the iso-α-acids surprisingly and unexpectedly prevents the formation of undesirable products. Furthermore, because the tetrahydroiso-α-acids are obtained in a lower alkanol solvent with a relatively small amount of water, the isolation of the tetrahydroiso-α-acids is facilitated.

One skilled in the art will appreciate that many modifications to the above-preferred embodiments can be made. For example, any metal ion which protects the β-triketo moiety carbonal groups is within the scope of this invention. Therefore, it is intended that the invention not be limited by the foregoing description, but only by the claims which follow.

We claim:

1. A method of preparing tetrahydroiso-α-acids comprising the steps of:

preparing a feed material of iso-α-acid metal salts wherein the metal ion is selected from the group consisting of alkali metals, alkaline earth metals, and transition metals;

dissolving the feed material in an aqueous lower alkanol solution containing about 5% to about 20% w/w water to form a reaction medium;

reducing the iso-α-acids in the presence of about 5–50 psig of hydrogen and a palladium on carbon catalyst at about 30°–50° C. to form tetrahydroiso-α-acids; and recovering the tetrahydroiso-α-acids.

2. The method of claim 1, wherein the temperature is about 40°–45° C.

3. The method of claim 1, wherein the hydrogen pressure is about 5–20 psig.

4. The method of claim 1, wherein the hydrogen pressure is about 20 psig.

5. The method of claim 1, wherein the lower alkanol is ethanol.

6. The method of claim 1, wherein the metal ion is an alkaline earth metal.

7. The method of claim 1, wherein the metal ion is an alkali metal.

8. The method of claim 1, wherein the metal ion is a transition metal.

9. The method of claim 6, wherein the alkaline earth metal ion is selected from the group consisting of magnesium and calcium.

10. The method of claim 7, wherein the alkali metal ion is selected from the group consisting of sodium and potassium.

11. The method of claim 8, wherein the transition metal ion is selected from the group consisting of iron, cobalt, copper, and nickel.

12. The method of claim 1, wherein the molar ratio of metal ion to iso-α-acids is at least 0.5:1.

13. The method of claim 1, wherein the feed material is prepared by isomerizing α-acids to iso-α-acids in the presence of said metal ion.

14. The method of claim 1, wherein the feed material is prepared by adding-said metal ion to an aqueous solution of iso-α-acids.

15. A method of preparing tetrahydroiso-α-acids comprising the steps of:

preparing a feed material of iso-α-acid metal salts wherein the metal ion is selected from the group consisting of alkali metals, alkaline earth metals, and transition metals and the molar ratio of the metal ion to iso-α-acids is at least 0.5:1;

dissolving the feed material in an aqueous lower alkanol solution containing about 5% to about 20% w/w water to form a reaction medium;

reducing the iso-α-acids in the presence of about 5–50 psig hydrogen and a palladium on carbon catalyst at about 30°–50° C. to form tetrahydroiso-α-acids; and recovering the tetrahydroiso-α-acids.

16. The method of claim 15, wherein the lower alkanol is ethanol.

17. The method of claim 15, wherein the temperature is about 40°–45° C.

18. The method of claim 15, wherein the hydrogen pressure is about 5–20 psig.

19. The method of claim 15, wherein the hydrogen pressure is about 20 psig.

20. The method of claim 15, wherein the metal ion is an alkaline earth metal.

21. The method of claim 15, wherein the metal ion is an alkali metal.

22. The method of claim 15, wherein the metal ion is a transition metal.

23. The method of claim 20, wherein the alkaline earth metal is selected from the group consisting of magnesium and calcium.

24. The method of claim 21, wherein the alkali metal ion is selected from the group consisting of sodium and potassium.

25. The method of claim 22, wherein the transition metal ion is selected from the group consisting of iron, cobalt, copper, and nickel.

26. The method of claim 15, wherein the feed material is prepared by isomerizing α-acids to iso-α-acids in the presence of said metal ion.

27. The method of claim 15, wherein the feed material is prepared by adding said metal ion to an aqueous solution of iso-α-acids.

28. A method of preparing tetrahydroiso-α-acids comprising the steps of:

preparing a feed material of iso-α-acid magnesium salts wherein the molar ratio of magnesium to iso-α-acids is at least 0.5:1;

dissolving the feed material in an aqueous lower alkanol solution containing about 5% to about 20% w/w water to form a reaction medium;

reducing the iso-α-acids in the presence of about 5–50 psig of hydrogen and a palladium on carbon catalyst at about 30°–50° C. to form tetrahydroiso-α-acids; and recovering the tetrahydroiso-α-acids.

29. The method of claim 28, wherein the lower alkanol is ethanol.

30. The method of claim 28, wherein the temperature is about 40°–45° C.

31. The method of claim 28, wherein the hydrogen pressure is about 5–20 psig.

32. The method of claim 28, wherein the hydrogen pressure is about 20 psig.

33. The method of claim 28, wherein the feed material is prepared by isomerizing α-acids to iso-α-acids in the presence of magnesium ion.

34. The method of claim 28, wherein the feed material is prepared by adding magnesium ion to an aqueous solution of iso-α-acids.

* * * * *

UNITED STATES PATENT AND TRADEMARK OFFICE
CERTIFICATE OF CORRECTION

PATENT NO.    : 5,767,319

DATED    : June 16, 1998

INVENTOR(S)    : Patrick L. Ting, <u>et al</u>.

It is certified that error appears in the above-identified patent and that said Letters Patent is hereby corrected as shown below:

References Cited

U.S. PATENT DOCUMENTS

Please add:

```
--4,234,516   11/1980   Koller et al. . . . 568/341
  5,296,637   3/1994    Stegink et al. . . . 568/341
  5,523,489   6/1996    Ting et al. . . . 568/347--
```

Column 8, line 42:

"870" should be --87%--

Column 8, line 53:

"950" should be --95%--

Signed and Sealed this

Ninth Day of February, 1999

Attest:

Attesting Officer

*Acting Commissioner of Patents and Trademarks*